H. N. MILLER.
MULTICOLORED APPARATUS.
APPLICATION FILED SEPT. 15, 1917.
1,346,234.                                    Patented July 13, 1920.
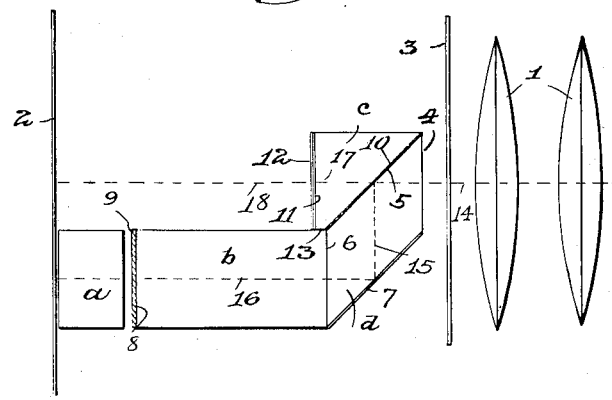
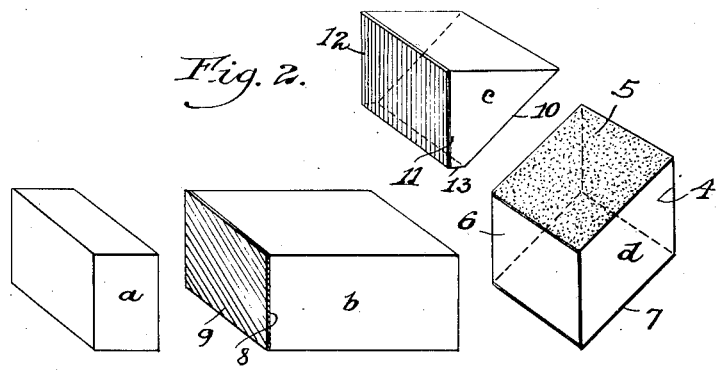
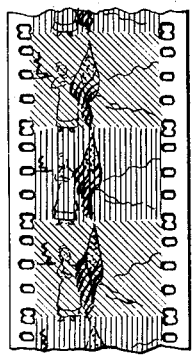

UNITED STATES PATENT OFFICE.

HENRY N. MILLER, OF CHICAGO, ILLINOIS.

MULTICOLORED APPARATUS.

1,346,234.   Specification of Letters Patent.   Patented July 13, 1920.

Application filed September 15, 1917. Serial No. 191,571.

*To all whom it may concern:*

Be it known that I, HENRY N. MILLER, a citizen of the United States, residing in the city of Chicago, county of Cook, and State of Illinois, have invented certain new and useful Improvements in Multicolored Apparatus, of which the following is a specification.

The purpose of the invention is to produce a motion picture film of multi-color, the different colored images being reproduced on the same film. In the present invention, the multi-color images, as for example, red and green are alternately photographed on the film in such a way that when the film is run through a projector, the effect of multi-color single pictures is produced. Another feature of the invention is to provide a process in which the multi-color features are taken through a single lens; also to provide a process in which novel means are used for dividing the rays of light which pass through the lens.

The invention is further characterized by its simplicity and economy of construction and reliability of operation. In the present invention, the objects are reproduced as negatives and then transferred as positives. It is to be understood that negatives through the use of filters have the color value or latent color and the color is brought out in the positives by suitable apparatus, which forms no part of the present invention.

In the drawings:

Figure 1 is a diagrammatic side elevation of the apparatus used in carrying out my invention.

Fig. 2 is a perspective view of the prisms shown separated.

Fig. 3 is a fragmentary face view of the positive film.

Referring to the drawings, 1 designates the lens of the camera and 2 the negative film. Between the film and the lens is interposed the intermittent movable shutter 3. The arrangement is such that the film and shutter are moved intermittently and synchronously, so that the shutter is in closed position while the film is moving from one position to the next.

As a feature of the invention, means are provided for dividing the rays of light that pass through the lens so as to reproduce two identical images on the negative, these images lying adjacent but not overlapping each other. To accomplish this end, between the shutter and the film is interposed a series of prisms designated $a$, $b$, $c$ and $d$ respectively. Describing the prism $d$, it has quadrilateral faces 4, 5, 6 and 7, respectively. The bottom face 7 takes the form of an opaque mirror forming a reflector surface for the light rays but not permitting any rays to pass through the face 7. The upper face 5 is semi-opaque, being half silvered so that half of the light rays will pass through the face 5 and half reflected downwardly.

The prism $d$ is mounted in an inclined position as shown in Fig. 1, so that the rays of light from the face 1, pass through the transparent surface 4, and impinge against the half silvered surface 5. The prism $b$ lies flush with the surface 6 of the prism and is preferably cemented thereto. It will be noted, however, that the prism $b$ lies in a horizontal and not in an inclined position. Between the front face of the prism $b$ and the film 1, is interposed a similar prism $a$, which prism is slightly spaced away as shown clearly in Fig. 1. This prism $a$ also can have a micrometer tilting adjustment so as to insure the two images at all times to lie in the same plane. To the front face 8 of the prism $b$ is cemented a yellow red glass filter 9.

Describing now the prism $c$, it will be noted that it is of generally triangular shape having its lower face 10 seated on and cemented to a half silvered surface 5 of the prism $d$. The arrangement of the prisms $c$ and $d$ is such that the rays of light pass through the surfaces 5 and 10 and then through front face 11 of the prism $c$. To this front face 11 is cemented an orange red glass filter 12. Preferably the lower edge of the prism $c$ has a flat surface 13, which rests on the edge of the prism $b$.

Describing now the direction of the rays of light, they are shown in the dotted lines in Fig. 1. Rays of light pass first along the dotted line 14 and strike the semi-opaque surface 5. Part of the rays of light are deflected downwardly as shown at 15 and then reflected by the mirror 7 along the dotted line 16, passing through the filter 9 and then through the prism $a$ to the film. That portion of the rays of light which pass through the semi-opaque surface 5 are shown along the dotted line 17, then pass through the filter 12 and then along the line 18 to the film 2.

The images projected on the negative film are then as heretofore stated transferred to a positive film by suitable process and apparatus which forms no part of the invention. The camera and the special apparatus forming one of the special features of this invention are preferably all formed as a single structure. It is also to be noted that by the present process, multi-color pictures are taken simultaneously through a single lens.

The invention is not limited to the details of construction shown, except as specified in the appended claim.

I claim as my invention:

In an apparatus of the character described, the combination with a lens, of a movable shutter and movable films, a prism mounted in inclined position and having a mirrored opaque surface on its lower face and a semi-opaque surface on its upper face, a triangular prism having its lower face engaging the semi-opaque face of the first prism and provided with a colored filter on its vertical side, a third prism fitting against the first prism and provided at the side remote therefrom with a colored filter and a fourth prism adjacent the film and spaced slightly from the second filter.

HENRY N. MILLER.